Feb. 11, 1930. J. G. ZIMMERMAN 1,746,330
COLOR PHOTOGRAPHY
Filed Jan. 29, 1926  3 Sheets-Sheet 1

Feb. 11, 1930. J. G. ZIMMERMAN 1,746,330
COLOR PHOTOGRAPHY
Filed Jan. 29, 1926  3 Sheets-Sheet 3

Witnesses:
William P. Kilroy
Harry R L White

Inventor:
James G. Zimmerman

Patented Feb. 11, 1930

1,746,330

UNITED STATES PATENT OFFICE

JAMES G. ZIMMERMAN, OF MADISON, WISCONSIN

COLOR PHOTOGRAPHY

Application filed January 29, 1926. Serial No. 84,575.

The present invention pertains to color photography, and more particularly to apparatus for producing colored pictures and for practicing the process defined in my Patent No. 1,583,381, issued March 4, 1926.

I propose to provide improved photographic screens and prints for use in my novel photographic process. I also propose to provide a novel process for manufacturing my screens and prints.

There are several basic principles in the science of light and color which are involved in any color reproduction process or method. I shall mention these briefly here below in order to enable the reader to have a more comprehensive understanding of the present invention.

One of these is the fact that white or uncolored light can be divided into three component or primary colors which, by proper intermingling or mixing, may produce all colors or shades of the spectrum. Then, too, each of these primary component colors has its complementary color. The three primary complementary colors of white or uncolored light are red, violet and green. These three colors will, upon properly blending them, produce all the colors of the spectrum; thus, if we cover an area with a mixture of small red and green dots, the appearance to the eye will be that the surface is colored yellow; similarly, red and violet will produce a magenta and violet with a green, a blue. Moreover, various combinations of all three of the colors will produce any color desired.

Nearly all objects capable of being photographed in colors contain many different colors, shades and depths of colors. Therefore, if a true and naturally colored picture is desired, it is necessary that this infinite variety of colors, shades and depths be accurately reproduced. It is well known in the color photography art that the light reflected by any object, and which constitutes the color of the object as seen by the eye, can be broken up into the specified three primary or component colors mentioned above and a record made of each. Then, by properly recombining these three records, a picture can be produced which will portray the object in its true color.

Now, in color photography, it is common practice to place a clear or transparent colored screen or filter between the object to be photographed and the negative. This screen is usually adapted to eliminate certain colors and to permit only a given color value to pass therethrough. Obviously, the result will be that the negative will have a certain definite color value which will be expressed in black and white only. Thus, for example, if a red screen be interposed between the object and the negative, all of the light, except the red rays will be absorbed by the screen and the consequent or resultant negative will be a record of the red rays only. These rays, however, will be reproduced in the proper depth and shade proportions on the negative. That is to say, the depth or shade will be faithfully recorded in shades of black and white or as they appear in gray.

By employing the above described process, a color value record can be produced which will faithfully reproduce the green rays. Similarly, a record may be made which will reproduce the violet rays. Then, by employing the well known Ives three color process a colored picture can be made by the use of these three records which will portray the object in its natural or true colors.

I find from experience that the Ives processes, as well as all other three color processes, are complicated, cumbersome, and are not suitable for the direct taking and printing of pictures in colors true to nature. The ordinary amateur photographer knows very little of these processes and usually cannot employ them, due to the fact that they are too expensive and cumbersome.

An object of the present invention is to provide a photographic process or method which shall be so simple in picture taking and producing depths, that colored pictures of substantially perfect quality may be taken and produced with facility by the ordinary amateur photographer; it being only necessary for such amateur to make use of my improved screens and print blanks under very simple directions, and the result will be a picture in colors instead of a picture in black and white.

Another object of the present invention is to provide an improved process of and means for enabling an amateur photographer to take colored pictures true to nature with any of the usual and simple cameras by simply employing my novel screen, print blank, and registering mechanism therefor.

In accordance with the features of my invention, I provide a taking screen or color filter which is adapted to be interposed between the lens of the camera and a sensitive plate or film and preferably in close contact with the film; the screen being a combination screen of the three colors necessary, to produce all the colors of the spectrum. The three colors or colored portions being preferably arranged in associated areas of such dimensions that they appear to the eye to blend perfectly together.

These color areas are preferably arranged in parallel line-like areas extending parallel to one edge of the plate in order to simplify the registration in the following steps of producing the picture; but it is of course to be understood that the invention is not to be limited to the form of these areas. In other words, I provide a screen adapted upon proper exposure to produce a negative which is preferably divided into line-like areas having certain related color values, which negative is in black and white and is adapted to be used to produce a contact print upon a prepared sensitized sheet which has similar and registerable line-like areas also colored in a predetermined manner.

Another object of my invention is to provide an improved type of screen for color photography having certain predetermined registerable qualities. Also, I propose to provide a novel process for manufacturing such a screen.

A further object of my invention is to provide an improved color photography sensitized sheet or print blank, as I term it, as well as a novel process for manufacturing the same.

A still further object of the present invention is to provide a novel combination of photography plates or films adapted to be registered in a predetermined manner to produce a colored picture true to nature comparatively cheaper than has been possible heretofore.

In accordance with the present invention, I provide an improved color screen having a plurality of lines, colored red, green and violet, respectively, and a record film for reproducing rays passing through the said screen when a colored object is exposed thereto. Also, I provide a color print blank adapted to be associated with the screen to produce a true color picture having a plurality of lines colored with colors complementary of red-orange, green and blue-violet, preferably blue-green, pink or magenta, and yellow. Moreover, means is provided for enabling the print blank to be properly registered with the record so that the complementary color of each color in the record is in immediate contact therewith. After the blank is developed, the result is a plurality of differently shaded and colored lines so close together that to the human eye they blend into a picture of the object in natural colors.

Other objects and advantages of the present invention will more fully appear from the following detailed description taken in connection with the more or less diagrammatic accompanying drawings, in which:—

In order to give a clear understanding of the processes involved in my improvement in color photography, I will first describe the several steps in a general way and in connection with the diagrammatic illustrations. These steps comprise chemical, physico-chemical and mechanism ideas, each one of which is relatively simple in itself, but they must all be understood in order to comprehend my improvement.

As is well known to those familiar with the art of photography, there are two processes in common use today for obtaining light impressions on paper, glass, celluloid or other surfaces. One depends on the action of light on the silver salts suspended in some colloid, such as gelatine which may be rendered evident by development. The other is the carbon process which depends upon the action of light on a colloid such as gelatine having a colored or other powder in suspension which has been previously sensitized by the use of some chemical such as potassium bichromate. Proper treatment thereafter will produce a record of the light action.

It is also well understood that the silver salts are affected by light roughly in direct proportion to the intensity of illumination or amount of light striking the salts. Consequently, where we have a variable quantity of light striking the plate surface, you will get a proportionately dense action (photo-chemical action) on the silver salts, so that when developed the plate will reproduce in density the strength of light affecting it. Where no light falls on the plate it will be clear after development and fixing in the usual manner.

Ordinarily the photographic plates of the silver salt type are not equally sensitive to all colors of light. In other words, the rays of light at the blue end of the spectrum have a greater effect in proportion of the time of exposure than any others. In fact, most photographic plates are not sensitive to red or the red end of the spectrum. However, films made by the use of silver salt and some colloid or a silver salt emulsion may be rendered sensitive to all bands of the spectrum from the deep red to the violet by bathing the plates in certain dyes which will, in some manner, change the effect of light on the silver salts, so that the silver salts are made sensitive to the red end of the spectrum. When a plate is so treated it is made sensitive to all (pan) colors and in the photographic art is commonly termed a "panchromatic plate".

Thus far in the photographic art it has not been possible to treat a photographic plate so that all colors effect it with equal intensity. In order to balance the effect of different colors, it is common practice to employ what is frequently referred to as a balancing screen, color screen, or filter. This screen or filter is dyed in such colors that when placed in line with or over the lens of a camera, it will cut down the intensity of the action of the blue end of the spectrum and leave the red end unaffected.

From the foregoing it will be obvious that with a panchromatic plate in the camera and a balancing screen over the lens, a photographic record may be obtained of any varicolored object on the plate or film with densities of blackness in proportion to the strength or intensity of illumination over each colored part of the object. The difference in density or blackness of the resultant reproduction will be the only distinction between such a record and the ordinary record made in accordance with the usual photographic processes. The ordinary plate will show a deep red as a pure white, while a panchromatic plate will show deep red as a gray or black and of an intensity in accordance with the intensity of light coming from the red. That is to say, a panchromatic plate will record the light rays (when used with their proper balancing filter screen) in their true relative illuminating intensity.

I shall now proceed to describe in detail the carbon process which consists briefly in producing an opaque film proportionate in thickness to the intensity of the light or effect of the light upon the film.

In the carbon process, when a gelatine or glue is treated with a solution of potassium bichromate or ammonium bichromate, or some similar sensitizing solution, the effect of light on such treated gelatine or glue when dry, is to cause it to become insoluble in hot water, whereas ordinary gelatine or glue is readily dissolvable therein. Thus if a negative produced by any process of photography shown in black and white is placed over another sheet of glass or celluloid coated with gelatine which has been treated with potassium bichromate and dried, the gelatine will be after exposure to light for a proper time, rendered insoluble in hot water wherever the light gets through the silver negative deposit, and will remain soluble wherever no light can reach it because of the blackness or opaqueness of the negative above it. The gelatine film so acted upon will present various thicknesses of gelatine which are insoluble in hot water, varying from no thickness at all where no light can strike it, to full thickness of the film where the light strikes clear through parts of the negative.

Figure 1:
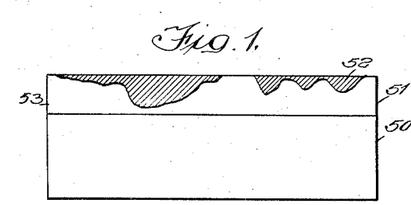
Figure 1 is a diagrammatic view illustrating the effect of light on a gelatine film which has been treated with potassium bichromate.

In Fig. 1 I have illustrated more or less diagrammatically the action of light on a sensitized sheet made in accordance with the carbon process. In this figure 50 denotes a backing which may be made of paper, glass, celluloid, or some other analogous and suitable substance. Mounted on this backing is a film of gelatinous material 51. The shaded portions 52 illustrate in an exaggerated form the portions which have been affected by the light and hardened so that they are insoluble in hot or warm water. As indicated generally by the reference numeral 53, the clear portions of the film which were unaffected by the light hence remain readily soluble in warm water. The soft portions 53 can be readily removed from the sheet, leaving the hard portions only for further use, as is well known to those familiar with photography.

The photographic construction illustrated in Fig. 1 may be termed a sensitized sheet prior to exposure, and after exposure it may be termed a photographic record. After the record is developed, I preferably call it a positive.

In order to make a record of the aforesaid kind so that it can be seen, it is customary to add to the gelatine film during the process of manufacture, a colored powder or carbon (lamp black). After the record has been developed by washing the same with warm water, leaving the carbon carrying gelatine record in relief on the glass or other transparent material plate, the carbon picture will be a graduated film of gelatine holding the carbon powder and giving a print from the record called a "carbon print." Therefore, it will be obvious that the printing is just like ordinary printing out or developing paper, only the developing is done by washing in warm water instead of by means of a developer.

The two processes, namely, the silver salt film and the carbon process of making photographic reproductions, are both involved in my improved color photographic process, but there are several very important optical principles the relations of which must be fully comprehended before it is possible to have a clear and comprehensive understanding of the present invention.

It is, of course, evident that the color records made in the usual way on carbon paper produce black and white results and not colored results. The difference, however, between ordinary photographic prints and those made employing panchromatic films and balancing screens would be that in the later case a better record, as well as one which would be more true to the eye as to the brightness of the objects photographed, would be produced than is the case with the former. Thus, a red rose would be quite black in a print made from a negative, while in a panchromatic negative print it would be of a lighter hue.

So far as I am aware, no method has yet been produced by which a plate such as I have described, produced in black and white and giving color values distributed over its whole surface, can be made use of to directly produce a colored picture. It has so far been necessary in the color photography art to mechanically divide the light into several component or primary colors and then by some means to recombine these colors in order to form a picture presenting the original view in its natural colors. As hereinbefore explained, we need only consider three colors, namely, red, violet and green. These three colors, or their three complementary secondary colors, namely, blue, magenta or pink, and yellow, on properly being blended will produce any other color of the spectrum.

In order to separate the records of the several colors and use the same for reproducing the original colors, I preferably make use of what is usually referred to as the complementary system, but before explaining this system and its application to my invention, I will first explain my improved method of obtaining a negative which presents true color values so separated or divided that I can recombine them again in my final color printing process.

By referring to the diagrammatic views illustrated in Figures 2 to 15, inclusive, in conjunction with the following descriptive matter thereon, it is believed a clear understanding may be had of the basic principles involved in the production of the color value record embodying the features of my invention.

Figure 2:
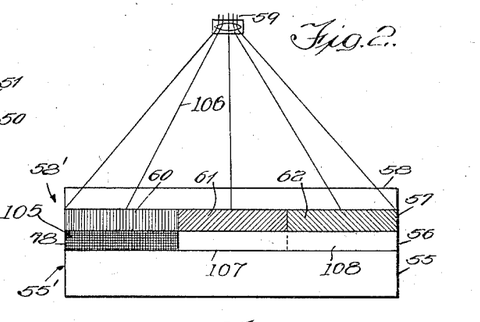
Fig. 2 is a diagrammatic view illustrating the manner in which a certain color may be reproduced on a record in black and white.

As shown in Fig. 2, 55 represents a glass backing of a sensitized plate or film, which in this instance is of the panchromatic type. Mounted on the glass backing is a sensitized film 56 which has the panchromatic features. Disposed over the film 56 is a screen including a film 57 and a glass backing 58. The screen I have designated generally by the reference numeral 58' and the sensitized sheet thereunder I have indicated generally by the reference numeral 55'. I shall preferably term the sheet 55' a photographic record, once it has been exposed to the light rays. After development the record may be termed a negative. Both the screen 58' and the sheet 55' are disposed in a camera (not shown), including a lens 59 by means of which the screen and sheet are exposed to light. The film 57 of the screen 58' is preferably divided into three portions or areas, each of which are colored differently. The first portion or band 60 may be colored red, the second band 61 violet, and the third band 62 green. Now, it is evident that in order for light from the object to reach the sheet, it must first pass through the lens 59 and the screen 58'.

I have shown the several bands as each being one third of the width of the plate so that as the light strikes the plate one third of the light must go through the red band before striking the sensitive plate, another through the green, and a third through the violet. If now we were to photograph a red object, the only part of the sensitive plate that will receive light will be the part under the red band for, obviously, a band of green or violet cannot let a red ray pass through these bands. That is to say, these bands being violet and green cannot transmit a ray they absorb. Consequently, only the red of the object that strikes the red band over the plate can get through and record on the film 56. Likewise, if the object photographed were green, only that section of the plate under the green band would be affected, and similarly with a violet object. However, if there were three colors in the object to be photographed, such as red, green, and violet, the plate would record wherever any light from the object struck through the color band of like color. Consequently, the plate would record each color and each record of the color will be opposite the band of like color in the taking screen. It is evident that if the object were yellow, which color reflects both red and green light, the sensitive plate 55' would record through both the red and the green bands of the screen 58', giving a record on the film 56 opposite both bands. Likewise any color of the spectrum would split up into two or three parts, if not one of the primary colors of the color band. Therefore, it will be seen that it is possible to get a record of all the colors as where no band or taking screen is used, but in this instance we have a mechanical division of the color records, which is a means for later reproducing the colors when printing the positive from the negative.

Figure 3:
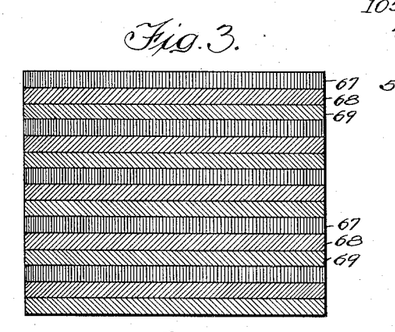
Fig. 3 is a view of my novel screen having a plurality of differently colored lines made in accordance with the principle illustrated in Fig. 2.
Figure 4:
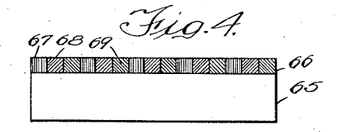
Fig. 4 is an end view of the screen illustrated in Fig. 3.

It can now be understood that in the taking screen, which is made up of many narrow lines stained or colored as described, instead of but three as shown in Fig. 2, it will be possible to divide the taking screen into a large number of three color or triple color bands instead of one large band of three. I have illustrated this idea in Figures 3 and 4. In these two figures the screen comprises a glass backing 65 and a film of suitable material 66 subdivided into a plurality of colored bands. The film is divided into a plurality of lines of the same three colors as I have illustrated in Fig. 2, namely, red, violet and green. These bands are indicated in Figs. 3 and 4 by the reference numerals 67, 68 and 69.

When we take a photographic record through this screen provided with the plurality of colored lines, we have a record which is exactly the same as that taken through the band of three lines shown in Fig. 2. By subdividing the film into a plurality of bands or lines, instead of only three as shown in Fig. 2, it is easier to get a complete or nearly complete record for the eye to view. To illustrate, if there were an object of red color in the picture and large enough to cover most of the plate, with a large band we would get only one-third part of the object in one piece on the plate under the red band, whereas if we use a line screen having a large number of bands the one-third picture of the object which would be produced beneath the red line would be spread out over the whole dimension of the image, giving its form and shape very well. Because of the many lines, the eye would see in effect the full object as red. Therefore, the next step is to make the line screen of sufficient fineness as to width of lines to make the final picture true enough to nature to cause the eye to see it in almost true size, shape and color. The same reasoning regarding a red object holds true for any other colored object.

In life, however, there are very few objects to be photographed that are only one of the three pure colors, namely, red, green or violet. Nearly every object is colored in a mixture of these in various degrees and with the result that the record taken under such a line screen gives us a record not in line but better in bands forming practically a continuous record even though on close examination the record will appear lined.

I shall now describe briefly how a colored picture true to nature can be produced by employing the record or negative described above. It is, of course, understood that in the making of a record to show color values we may make use of the plate behind a screen which is properly colored to produce the light value record in parallel band form on the negative plate although, of course, it should be understood that it is not absolutely essential that the records be made in the form of parallel bands, as they can be made in any other form of areas. However, the essential idea is that the three colors are arranged so that each covers substantially a third of the plate and the three together cover the complete surface of the plate.

Figure 5:
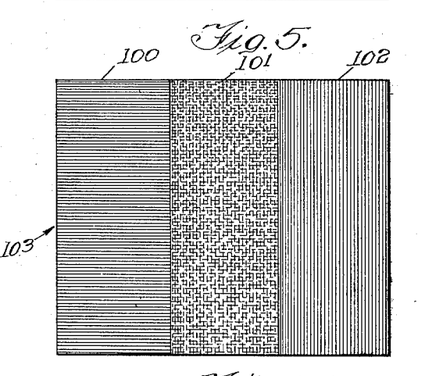
Fig. 5 is a diagrammatic view illustrating the principle involved in the sectionalizing and coloring of my novel print blank.

As stated hereinbefore, I preferably make use of the carbon process in the production of a colored picture from the light value record produced upon the plate. Obviously, instead of mixing carbon with the gelatine film we can color it any color desired, and thus produce colored instead of black pictures. For a clear understanding of the process, let us first consider the large three color band screen with only three bands of red, green and violet covering the whole plate, as shown in Fig. 2, and let us produce a paper which we will use, on which to print the positive from the negative with three bands as illustrated in Fig. 5 with a blue-green colored gelatine band 100, a yellow gelatine band 101, and a pink or magenta gelatine band 102. The three colored bands are mounted upon a glass backing 103 (Fig. 7).

Referring now again to Fig. 2, 105 indicates a record back of the red band of the screen which is the result of the projection of red light on the screen from a red object. That is to say, inasmuch as the object being photographed is red only red rays 106 will emanate from the lens of the camera. Then, too, the violet and green will absorb these rays rather than permit them to pass through the corresponding portions of the record. The red band of the record will be the only place where the rays can penetrate to the backing of the record. Now, when the exposed plate or record shown in Fig. 2 is developed, we will find that under the red band section of the screen there will appear on the negative a black deposit of silver in different graduations of density in accordance with the variable shape and color density of the object photographed. The other two bands of the screen being unaffected by the rays will not deposit any silver. The section 105 of the record in Fig. 2 illustrates the deposit of silver under the red section of the taking screen after the exposed film has been developed.

Figure 7:
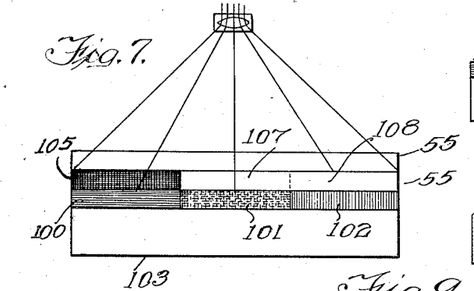
Fig. 7 is a diagrammatic view illustrating the principle involved in forming an image upon my novel print blank.

In Fig. 7, I have illustrated the printing of the print blank shown in Fig. 5 through the developed record or negative produced, as shown in Fig. 2, and I place the part or section 105 which was exposed under the red band of the screen, over the blue-green band 100 on the positive plate. The portion 107 which was beneath the violet band of the screen is now placed over the yellow band 101 of the print or positive plate and the portion 108 of the record or negative which was beneath the green band of the screen is now placed over the pink or magenta band 102 of the print blank. It will be found that in each instance the complementary bands register accurately with their corresponding primary color locations in the screen plate to which the film was first exposed.

Figure 8:
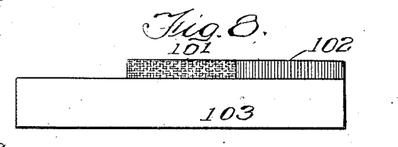
Fig. 8 is a diagrammatic view of the print blank illustrated in Fig. 7 after the same has been developed.

If now we expose the print paper to the light through the negative as shown in Fig. 7, the blue-green band 100 of the print paper will be protected from the light and the pink or magenta and yellow bands not being protected will be rendered insoluble by the light. The blue band, however, will remain soluble. That is to say, the yellow and pink bands, being exposed to the light will become hardened; the blue band, however, will remain as soft gelatine. After thus printing, the positive is washed in warm or hot water until all the salts or soluble gelatine is washed away, as best shown in Fig. 8. It will be noted in Fig. 8 that the yellow and pink gelatine bands remain on the paper.

Figure 9:
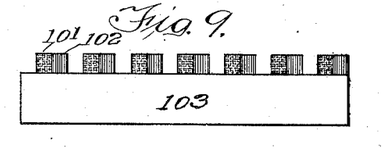
Fig. 9 is a diagrammatic view substantially like Fig. 8 only differing therefrom in that it has a plurality of lines, whereas the blank illustrated in Fig. 8 has only three differently colored portions.

Inasmuch as our original object was red, we have a final record of yellow, plus pink, which equals red. Let us now consider the screen having narrow colored lines as shown in Figs. 3 and 4. If a record was now made in the same manner using the screen illustrated in Figs. 3 and 4 with narrow lines, obviously the same yellow and pink record will result, but the lines will be fine instead of coarse and they can be made fine enough so that to the eye the picture will appear almost exactly in proportion to the original red image, as illustrated in Fig. 9. Of course, it is to be understood that in order to produce such an image as shown in Fig. 9, it is necessary to employ a print blank such as that illustrated in Fig. 6 having a plurality of lines or bands colored in the same manner as the print shown in Fig. 5. The lines must be made narrow enough so that the eye will see the object correctly or nearly so. Of course, as explained for a red record, the other colored records will be likewise divided over the whole surface of the image and will produce their effect upon the eye. From the foregoing it is believed apparent that the process of producing a colored picture from a line record giving color values embodying the features of the present invention, comprises the printing or production of the tri-color lines, blue, yellow and pink in proper relation to the negative screen lines, red, violet and green.

To further and more clearly illustrate the several important steps involved in the process of first separating and then combining the colors in order to produce the colored photograph, I now refer particularly to Figures 10 to 15, inclusive, in which I have illustrated in a greatly exaggerated manner what occurs as to the separation and recombining of the colors by the use of my finely lined color selective screen in connection with the production of a color value record or negative, and when such negative is used to print on a similarly finely lined and colored print blank.

Figures 10, 11, 12:
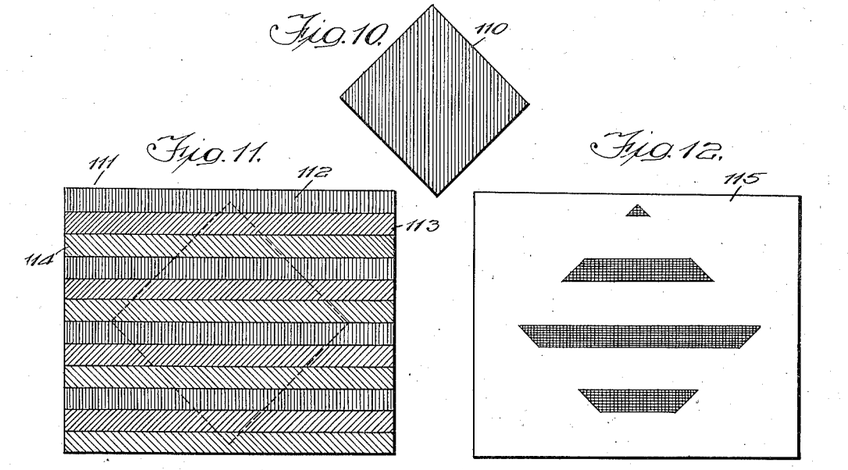
Fig. 10 is a diagrammatic view of a red object.
Fig. 11 is a diagrammatic view of my novel screen with the object positioned thereover.
Fig. 12 illustrates diagrammatically a record taken from the screen and object illustrated in Fig. 11.
Figure 13:
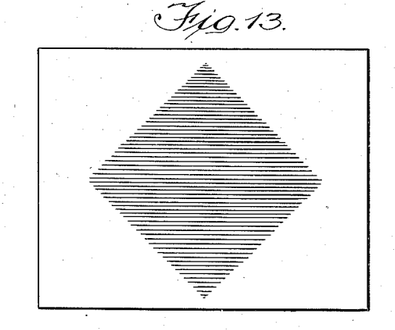
Fig. 13 is a diagramatic view similar to Fig. 12 showing how the colored lines may be made closer together to more nearly produce a true reproduction of the object.

In Fig. 10 I have illustrated a red object 110 to be photographed. The object, for purposes of illustration, is preferably shown as being rectangular in form, but it is of course to be understood that the object may be of any size, shape, or color. In Fig. 11 I have illustrated a screen 111 having a plurality of colored lines colored in a given sequence. This screen, of course, includes a film and a suitable backing therefor. This screen is provided with red lines 112, violet lines 113 and green lines 114. Now, by placing a panchromatic film, such as that shown in Figs. 2 and 12 under the screen and exposing both of them to the light rays emanating from the object 110, a record may be produced on the said film. I have indicated the film in Fig. 12 generally by the reference numeral 115. In accordance with the principles discussed in connection with Fig. 2, only the red lines 112 of the screen will permit light to reach the panchromatic film. Wherever this light touches the film a record will be made as shown in Fig. 12. Then, too, the portions of the film on the panchromatic record immediately below the violet and green lines will be unaffected by the light rays emanating from the red object, inasmuch as these rays will be absorbed by the violet and green lines. Then by developing the panchromatic film 115 in the usual manner, a negative will be obtained in which the portions immediately under the red lines of the screen will appear on a negative as a black deposit of silver in different graduations of density in accordance with the variable shape and color density of the object photographed, but under the other two bands of the screen the salts will not be affected and there will be no deposit of silver whatsoever. These flat patches or records as shown constitute parallel lines which occupy or cover one-third of the image. The one-third feature, however, is of course merely taken as arbitrary. Satisfactory results may be attained as long as the areas of the three colors used are exactly the same, inasmuch as the optical effects depend on a balance. That is to say, the spaces between the adjacent bands are twice as wide as the bands or lines themselves. Fig. 13 shows to a better degree the actual condition of the red record by the use of finely lined screens. It is evident that the fine lines in this view are spread out over the whole area of the image 110 and the eye in looking at such a negative will see the whole image and not the isolated patches or bands shown in Fig. 12.

Figure 6:
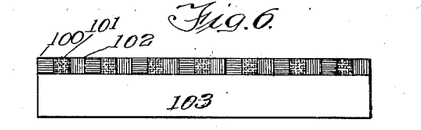
Fig. 6 is a diagrammatic view of the end of my print blank illustrating a plurality of differently colored lines.
Figure 14:
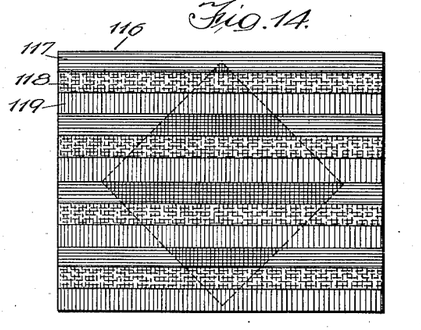
Fig. 14 is a view of the record illustrated in Fig. 12 positioned on my novel print blank.
Figure 15:
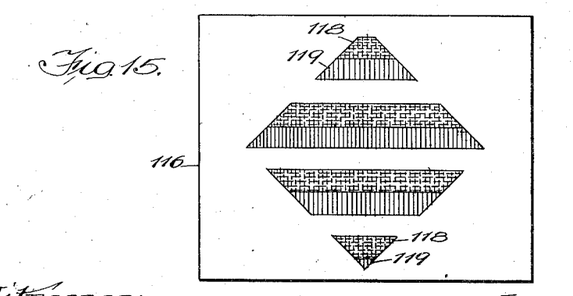
Fig. 15 is a diagrammatic view illustrating the reproduction from the record on my novel print blank.

In Fig 14 I have illustrated the finished negative taken from the record illustrated in Fig. 12, superposed upon a print blank 116 comprising essentially a backing and a gelatinous film and being of much the same construction as the print blank illustrated in Fig. 6. This print blank 116 has a plurality of colored lines, colored in a predetermined sequence. I have indicated by the reference numeral 117 a blue line, 118 a yellow line, and 119 a pink line. It should be noted that the red markings on the film 115 superposed thereon are placed immediately over the blue line of the print blank. Upon exposing the negative and print blank shown in Fig. 14 to light, the light rays will penetrate the negative and harden certain portions of the gelatine on the print blank 116. Obviously, light will not pass through the black markings or black impressions on the negative or record 115. Therefore, only the yellow and pink lines of the print blank will be affected by the light. By washing the print blank after it is exposed to light in hot or warm water all of the soft gelatine of the film thereof may be washed away, leaving the hardened gelatine which was exposed to light, as shown in Fig. 15. It should be noted that the portions of the hardened gelatine remaining on the print blank backing are of only yellow and pink color which, when taken together, give a red effect.

Now it will be seen that if, instead of employing a print blank having real wide lines of coloring, a print blank was employed having fine lines, such as that shown in connection with the screen blank in Fig. 13, that the yellow and pink lines will be closer together and a much truer image of the object photographed will be reproduced.

Another idea involved in this color process is that each of the primary colors has its complementary or secondary color. Thus we have for the primary colors red or red-orange, violet and green, the three respective secondary or complementary colors, blue or blue-green, yellow and pink or magenta.

The principle which underlies this invention regarding the production of colors by the juxtaposition of complementary colors is well illustrated by the following equation between the primary colors red, green and violet on the one side, and complementary colors yellow, magenta, and blue-green on the other side.

(a) Yellow is made up of or equals red plus green;
(b) Magenta is made up of or equals red plus violet;
(c) Blue-green is made up of or equals green plus violet.

Looking at it from another point of view, yellow consists of the three primary colors, minus the violet; magenta consists of the three primary colors minus the green; and in like manner blue-green consists of the three primary colors minus the red.

When the effect of yellow is combined with that of magenta by placing them alongside of each other as in the additive method of producing color pictures, we have, taking the equations (a) and (b) the following:

(a) Yellow equals red plus green,
(b) Magenta equals red plus violet,
Yellow plus magenta equals 2 red plus green plus violet.

(Red plus green plus violet equals white), and we have for the second part of the equation as a final result yellow plus magenta equals red plus white, or we have red predominating, and as this appears over two thirds of the area and the lines are so fine that they disappear as lines, we have a red picture of a red object.

In the same way magenta plus blue-green equals violet plus white, yellow plus blue-green equals green plus white, so that by the proper distribution of the three complementary colors, yellow, magenta and blue-green, the three primary colors can be produced and, of course, properly distributed to produce all of the color effects wanted.

When we produce the positive of a red object by the process above outlined we will not have a final record opposite the portion of the negative which registered with the red record, but opposite to the other two portions. These other two portions, as mentioned above, show yellow plus pink which in reality equals white plus red-orange. The eye, however, will see a red object occupying not one third of the plate in accordance with the red record on the negative, but two-thirds of the plate, and if the lines thus produced are close enough together, the eye will see the whole object as red. The same effects are produced by other colors, so that for the record of the green rays we obtain the yellow plus blue and for the violet rays we obtain pink plus blue.

If the pink of the plate were registered with the red record of the negative, the deeper the red printed on the negative the less printing effect I could produce upon the positive to show red. In other words, if the red record were deep no record would be produced by exposure upon the red beneath and consequently all of the red being thus unhardened, would wash away leaving the positive blank in the red space.

In my complementary method, if only a few red rays are registered on the negative, some light would get through the red lines and would harden the blue gelatine line there below. Thus the portions of the blue line that would remain would modify the red produced by the pink and yellow lines, and reduce the intensity of the final positive to accord with the slight red tint of the object. We have then this principle as operative in the production of pictures; the stronger the red the less the blue will appear in the positive and the pink and yellow appearing will show intense red; the less red rays recorded the more the blue will show, which will cut down the red appearance of the pink and yellow and so accord with the color of the object. This analysis is true for the other colors.

As previously explained, the color value negative produced by a lined screen plate embodying the features of my invention and the printing of colored pictures on a similarly lined print blank from the negative constitutes the foundation of the present invention. Of course, it is to be understood that many further processes, steps and details are involved in the commercial production of colored pictures, using the methods described as the foundation.

It is necessary, of course, to produce a proper lined and tri-colored screen and a similarly lined and tri-colored print blank, the lines on the print blank being colored complementary to the colored lines of the screen, and to provide means for producing an accurate registration between the color value lines or areas produced upon the negative exposed through the lined screen and the colored lines on the print blank, so that the final printed picture produced when the paper is exposed beneath the negative shall have the proper distribution and value of color, to produce a colored picture of the object in its true and natural colors.

Figure 16:
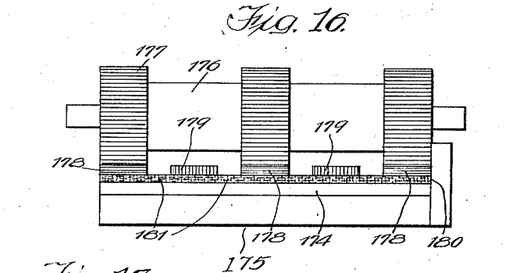
Figs. 16 and 17 are diagrammatic views illustrating the steps involved in the manufacture of my novel print blank.
Figure 17:
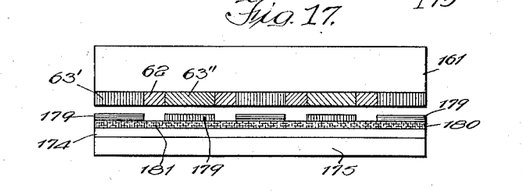
Figure 18:
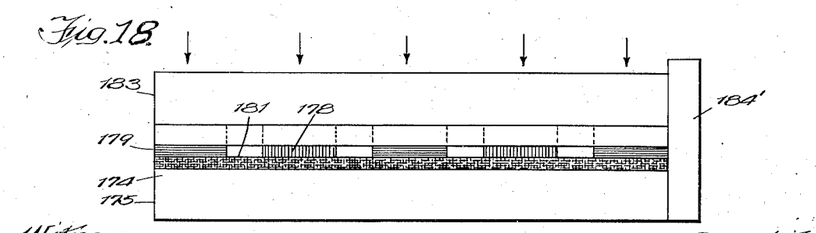
Fig. 18 is a diagrammatic view illustrating the reproduction of the image in the record upon the print blank embodying the features of my invention.

It will be understood, from what has gone before, that in order to produce a colored picture from the black and white color value record produced in the panchromatic film, it is necessary to prepare a suitably lined colored print blank having the complementary colors thereon in lines adapted to register accurately with the color value lines of the negative. Referring now more particularly to Figs. 16, 17 and 18, I shall describe the process of manufacturing my novel print blank. I preferably provide a ruled or printed paper 174 mounted upon a suitable backing such as metal or glass plates 175 and so ruled as to correspond in register to the three colored lines of the taking screen. A roller process may be used for the production of the print, although of course, it may be, and is, practical to employ zinc plates having their ridges of proper width and spacing to print the colored lines corresponding to the soft gelatine lines of the screen. However, it should be understood that if the plates are used, but two plates will suffice for the third or alternate color may be spread over the entire paper surface and the other two colors printed on top of it, leaving exposed a one-half width line of the original whole surface. As best shown in Fig. 16, I preferably provide a roller 176 having flat printing bands or rings 177 properly spaced to print alternate wide lines 178 on the paper 174. These lines or bands 178 are spaced to correspond with the one set of wide lines on the screen plate, and I make use of alternate rollers for printing the other color lines 179 on this paper backing. I can, as indicated in Fig. 16, spread the yellow color 180 on the whole surface of the print paper 174 and then print the pink and blue colored gelatine ink upon the yellow backing thus prepared. The pink and the blue, being of double width and providing yellow lines 181 in the spaces between them of half width, and providing a print paper having yellow, pink and blue in the proper relations and widths to correspond with the violet, green and red, respectively, of the lined screen plate.

In Fig. 17 I have shown the screen plate and the print paper thus prepared in associated registered relation. It should be noted that the broad band of pink 179 of the print paper 174 is beneath the green band 163″ of the screen, the broad blue band 178 of the print paper is beneath the red band 163′ of the screen, and the narrow yellow alternate bands 181 of the paper are beneath the alternate and narrow bands 162 of the screen, which are violet.

It will be understood, of course, that in practice the print paper and the screen are never thus associated, but the screen is associated with the panchromatic negative and then later on to produce the final print the negative is associated with the prepared print paper. In Fig. 18 I have associated the record made from the screen with my novel print blank in order to produce a colored photograph. The several light value lines of the record are arranged in proper superimposed registered position relative to the several colored lines of the print paper, and the negative and the paper thus registered will reduce the error of parallax.

Of course, I desire it understood that in order to render the print blank sensitive to light, it is necessary after the completion of the colored rulings or colored areas, to treat the same with potassium bichromate. The paper when so treated is ready for the reproduction of picture colors in accordance with the principles involved in Fig. 18. The inks I have employed in connection with the manufacture of the print blank are preferably of the gelatine or glue order having the proper pigments in them to give the three colors, blue, pink and yellow.

It is believed obvious that the several colors of ink on the print paper are simply dyed several colors so as to produce in the plate itself the color desired, and having disposed the paper beneath the panchromatic negative, a record is obtained upon the paper and that the exposure of the paper beneath the negative hardens the gelatine to various depths, depending upon the penetration of the light through the negative. The print, however, or rather the picture, is not as yet discernable and I preferably proceed as follows to produce the record in visible form.

The record on the print is not yet visible— it is only a surface on which there is a printed record of variable depth all over into the three colors of gelatine, which record is insoluble in warm water, the remaining gelatine parts of the colored lines of the paper are soluble. To make the print visible we must first soak the print in cold water to wash out the potassium bichromate (which is yellow) and to soften the whole gelatine surface but not to wash any away. I may now proceed in accordance with what I term the transfer process. In this process I provide a sheet of transfer paper or transfer surface which has a hardened gelatine surface equal in extent to the print which has been made, which after wetting will stick to the hard gelatine of the print and I roll it into close and firm contact therewith. By employing the single transfer process as I do the hardened gelatine of the transparent film is utilized as a permanent base. Of course, a double transfer could be employed, such as is well known in the photography art. Such a process could be very easily accomplished by employing the usual steps in the carbon process as is well known in the art.

In making a picture which includes black objects or deep shadows which reflect very little or no light, it is sometimes desirable to make compensation therefor so that the resultant picture will properly portray such object. This is necessary because the silver negative taken thru the colored screen will be clear where the image of the black object falls, since no light passes thru the screen as none is reflected or emitted by the black object. When a print is made upon my prepared lined paper all of the three colored lines over the area covered by the image of the black object will be fully printed, as the negative is clear and permits a maximum of light to strike the print paper and the result will be that the image will not appear in the picture as black but as more or less white, not being clear white because some light rays will penetrate the colored screen even over the area of a black object.

The compensation that is spoken of above is, therefore, necessary to decrease the light reflected from such portions of the picture to deepen the shadows and to make the black or dark objects appear more nearly in their true tone value. I accomplish this by combining with the color picture, a black and white silver print or positive made from the same color value negative, and associate this black and white print with the color print in some manner so that the dark portions of the silver print will tone down the colors of the color print. It is, of course, necessary to register the silver print with the color print, but as these have both been registered with the same negative, this is an easy matter to accomplish by means of my straight edge scheme of registration already explained.

It will be understood, of course, that the silver print will show black or dark over the areas covering the deep shadows or black objects and when placed over the color print in line registration therewith will darken or decrease the light coming from the colored lines covering such areas.

The panchromatic record may be brought into proper register with the screen or the print blank in any suitable or preferred manner, as will be apparent to those skilled in the art.

While I have described my invention as making use of the silver salt or negative process for producing the light value record for use with the tri-colored print paper and also of producing the light value record in associated narrow lines parallel with one edge of the plate, it should be understood that my invention is not to be thus limited, and as many modifications of my invention will readily suggest themselves to those skilled in the art, I do not intend that I shall be limited to the specific steps and structures, nor to the precise order of procedure herein illustrated and described.

I claim:—

1. A photographic print blank for use in color photography having a plurality of light sensitive areas presenting three colors, the combination of any two of which colors will produce a color complementary to the third color.

2. A photographic print blank having juxtaposed limited areas of complementary colors for producing an additive color effect.

3. A photographic print blank having a plurality of parallel lines of three complementary colors juxtaposed in regular sequence, the intensity of the coloring of the said lines being variable to correspond to the variations of color of an object being photographed.

4. A photographic print blank having a plurality of areas colored with complementary and minus colors adapted to be used additively in photography.

5. A photographic print blank having a substantially white surface upon which are a plurality of areas colored with complementary pigment colors adapted to be additively combined to produce the effect of primary colors.

6. A print blank for use in photography having light sensitive areas presenting three complementary secondary colors, the combination of any two of which additively will produce a primary color.

7. A print blank for use in photography having light sensitive areas presenting three complementary secondary colors, namely, blue, yellow and pink, the combination of any two of which additively will produce a primary color, such as red, violet and green.

8. A print blank for use in photography including a film of gelatinous material divided into a plurality of lines alternately colored differently with complementary secondary colors adapted to be additively combined to produce primary colors.

9. A print blank for use in photography having a film of gelatine of one color, and lines of gelatine imprinted upon the said film, the imprinted lines being another color and separated to expose lines of film between them.

10. A photographic print blank comprising a substantially flat film of gelatine of one color, selected areas of differently colored gelatine imprinted thereon, and selected areas of third colored gelatine also printed on said flat film, the selected imprinted areas each constituting one third of the area of the film.

11. A photographic print blank comprising a film of colored gelatine having printed thereon a plurality of parallel lines of gelatine ink of one color, and a printing of a similar but alternate plurality of equal width lines of a second color of gelatine, the two sets of lines being separated to expose the colored gelatine film in lines between the printed lines of one half the width of said printed lines.

12. A photographic print blank comprising a backing sheet having a coating of gelatine ink of one color, imprinted lines upon said ink surface with gelatine ink of another color, and like alternate lines of a third color, the two sets of imprinted lines being separated to expose the surface of the first ink in half width lines between them, and the three colors being capable of combining to exhibit all the colors of the spectrum.

13. The process of preparing print blanks for color photography which consists in providing a film of gelatine of one plain color, then imprinting lines of gelatine upon said film, the imprinted lines being of another color, and separated to expose lines of film between them.

14. The process of making print blanks for colored photographs which consists in preparing a flat film of gelatine of one color, printing gelatine upon the film in selected areas of another color, imprinting other areas with a third colored gelatine, the selected imprinted areas constituting each one third of the area of the film, and leaving exposed one third the area of the film, the three colors being preferably yellow, blue and pink.

15. The method of preparing print blanks for colored photographs which consists in preparing a backing sheet with a film of gelatine of one color, printing a plurality of parallel lines of gelatine ink of a second color upon said backing, printing a similar but alternate plurality of equal width lines of a third color of gelatine on the backing, the two sets of lines being separated to expose the colored film of the backing in lines between the printed lines of one-half the width of said printed lines.

16. The method of producing print blanks for color photography which consists in covering the surface of a backing sheet with gelatine ink of one color, imprinting lines upon said ink surface with gelatine ink of another color and like alternate lines of a third color, the two sets of imprinted lines being separated to expose the surface of the first ink in half width lines between them, the three colors being capable of combining to exhibit all the colors of the spectrum.

17. A photographic print blank having juxtaposed limited areas of complementary colors for producing an additive color effect, and means for enabling its registration with a photographic record having predetermined color values.

18. A photographic print blank comprising a substantially flat colloid of one color, selected areas of differently colored colloid imprinted thereon, and selected areas of third colored colloid also imprinted on said flat colloid, the selected imprinted areas each constituting substantially one third of the area of said flat colloid, said imprinted areas being separated so as to expose areas of the flat colloid.

19. A print blank for use in photography having a light sensitive area capable of being exposed under a color record and colored in areas consisting of the secondary colors such that primary colors may be produced by their additive action.

20. The process of manufacturing print blanks for use in photography which consists in applying a light sensitive coating to a backing and providing said coating with areas presenting three complementary secondary colors adapted to be additively combined to produce primary colors.

In witness whereof, I hereunto subscribe my name this 22nd day of January, 1926.

JAMES G. ZIMMERMAN.